July 16, 1968  F. L. WAITE  3,392,819

CONVEYOR

Filed Oct. 17, 1966

INVENTOR:
FRED L. WAITE

BY *Bradley Cohen*

ATTORNEY

United States Patent Office 3,392,819
Patented July 16, 1968

3,392,819
CONVEYOR
Fred L. Waite, 1435 Bedford St.,
Stamford, Conn. 06905
Filed Oct. 17, 1966, Ser. No. 587,223
8 Claims. (Cl. 198—195)

ABSTRACT OF THE DISCLOSURE

A rod conveyor of the type supported between two chains. The rods are slidably mounted in flat bearing blocks which form links of the chain and permit the conveyor to move around a curve.

---

This invention relates in general to conveyors and more particularly to a conveyor having a conveyor apron consisting of spaced apart rods, the rods extending between a pair of conveyor chains.

A main object of this invention is to provide a conveyor for bakery goods which may follow a curved path, the conveyor having spaced apart rods extending between a pair of conveyor chains.

Another object of this invention is to provide a longer lasting, more wear resistant conveyor rods extending between a pair of conveyor chains with the rods being held from rotating in spaced apart pairs.

A further object of this invention is to provide a less expensive and cleaner operating conveyor for bakery goods and the like.

An additional object of this invention is to provide a more easily cleaned and maintained conveyor having conveyor chains and spaced rods extending therebetween.

Many other objects, advantages, and features of invention reside in the particular construction, combination, and arrangement of parts involved in the embodiment of this invention and its practice as will be understood from the following description and accompanying drawing wherein.

Figure 1:
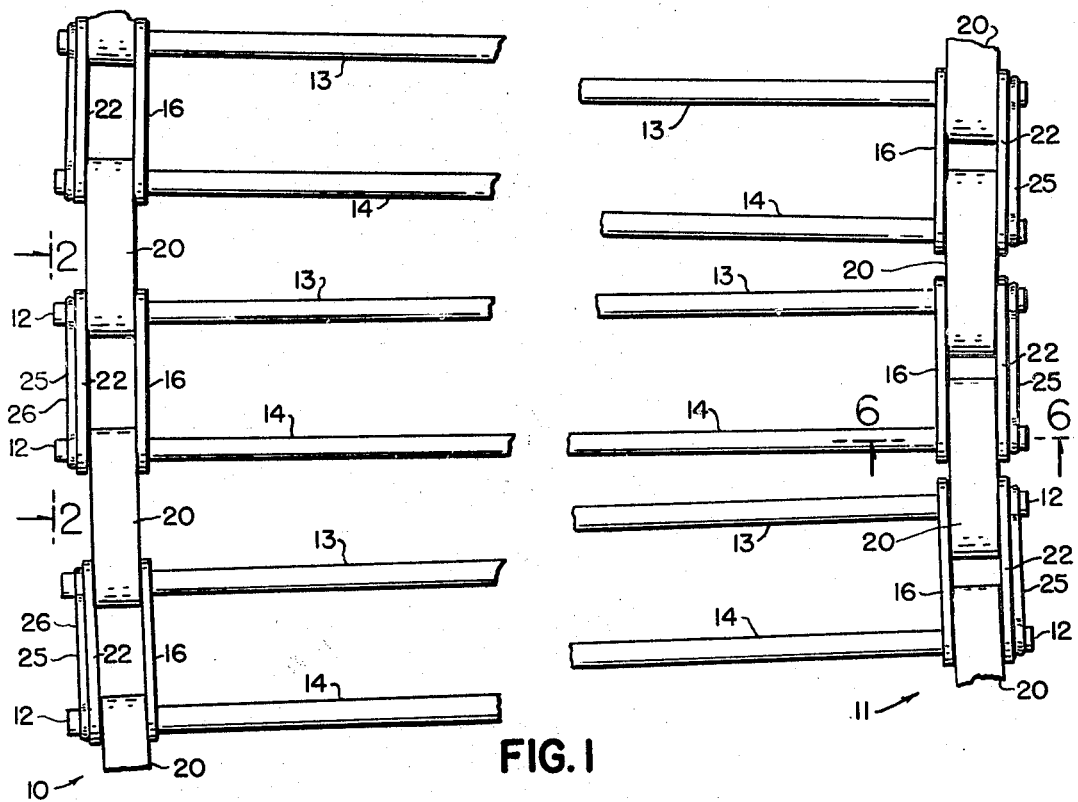
FIG. 1 is a top view of a fragment of a conveyor according to the invention, the fragment of the conveyor begin shown in a curved path and the fragment of the conveyor having a central portion broken away.
Figure 2:
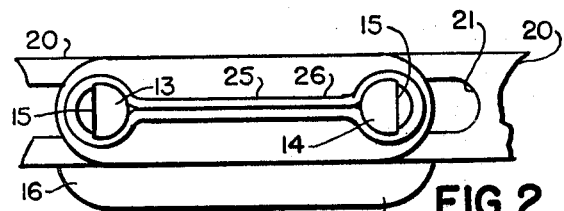
FIG. 2 is a side view of a fragment of the conveyor chain as viewed from line 2—2 of FIG. 1.
Figure 3:
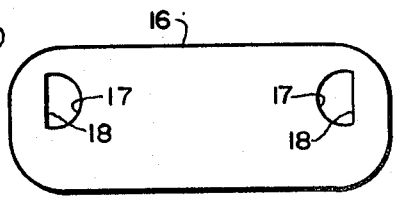
FIG. 3 is a side view of a conveyor chain inner link.
Figure 4:
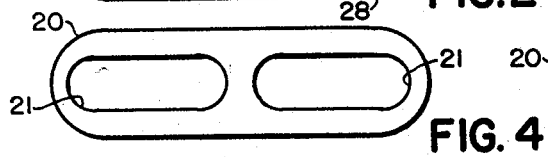
FIG. 4 is a side view of a chain bearing block.
Figure 5:
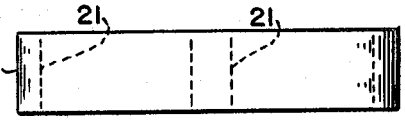
FIG. 5 is a top view of the chain bearing block of FIG. 4.

Referring to the drawing in detail, the conveyor of this invention has two conveyor chains generally designated by the reference numerals 10 and 11. These chains 10 and 11 are driven by suitable sprockets (not shown) in endless loops. The drive sprockets are best located to put the chains 10 and 11 under tension at the ends of long straight runs to minimize wear which would otherwise result from flexing the chains 10 and 11 while under tension. Between, before, or after such straight runs the conveyor chain of my invention may describe a curved path as shown in FIG. 1 and as will be hereinafter described.

Figure 6:
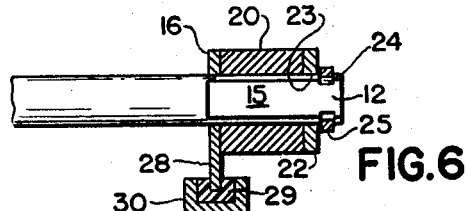
FIG. 6 is a section on line 6—6 of FIG. 1.
Figure 8:
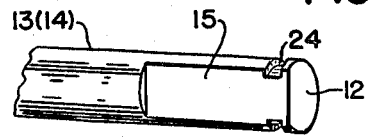
FIG. 8 is a perspective view of a broken away end of a conveyor rod.
Figure 7:
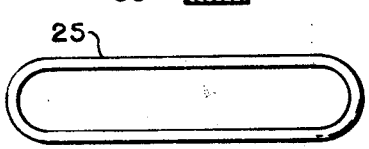
FIG. 7 is a side view of a link fastener before installation.

Each chain 10 and 11 has the ends 12 of pairs of rods 13 and 14 extending through it. As shown in FIGS. 6 and 8, each rod end 12 has a longitudinal flat surface 15 formed on it. Inner links 16 contain a pair of D shaped apertures 17 having outwardly disposed flats 18. These inner links 16 are slipped over the ends 12 of paired rods 13 and 14 with the inward extension of the flat surfaces 15 positioning the inner links 16 by limiting the inward travel of the links 16 on each pair of rods 13 and 14.

Connecting bearing blocks 20 contain two elongated apertures 21 with at least outwardly disposed rounded ends. The apertures 21 are of substantially the same width as the diameter of the rods 13 and 14. An end 12 of unpaired rods 14 and 13 of adjacent rod pairs extends through each aperture 21 of a bearing block 20. Directly outside the bearing blocks 20 are positioned the outer links 22 for each pair of rods. Links 22 each contain a pair of apertures 23 as shown in FIG. 6. These apertures 23 are also best made D shaped similar to the apertures 17 of the inner links 16 so that the D shaped apertures may resist wear and elongation while the chains 10 and 11 are under tension by having the flats of the D shaped apertures 23 also bear on the flat surfaces 15 of the rod ends 12. The non-circular shape of at least one of links 16 and 22 prevents rotation of rods 13 and 14. Nonetheless, the round of the rod and not the flat 15 engages under tension the outer ends of slots 21 of bearing blocks 20.

The ends 12 of the rods 13 and 14 each contain a circumferential groove 24. After the chains 10 and 11 have been assembled as described, the oval link fasteners 25, which are stamped from suitable sheet metal, are placed about the ends of adjacent pairs of rods 13 and 14 next to each other link 22 and then the centers 26 of the fasteners 25 between the rod ends 12 are crushed together to seat the fasteners 25 in the grooves 24 as shown. While not preferred, it is obvious that the aperture 21 of each block 20 could communicate with each other to form a single aperture.

The lower portions 28 of the inner links 16 may extend below the chains 10 and 11 to slide in a slotted plastic track 29 set in a metal channel 30 as shown in FIG. 6. If desired, the bearing blocks 20 may slide on a suitable track with the lower portions 28 of the inner links 16 acting as guide flanges.

As shown in FIG. 1, if the tracks on which the chains 10 and 11 rest curve while remaining a set distance apart, the rods 13 and 14 will slide within the elongated openings 21 of the bearing blocks 20 to effectively shorten the inner chain 11 as shown. This moves the inner ends of adjacent pairs of rods 13 and 14 closer together.

As has been described, the D shaped apertures of the inner links 16 space the inner links 16 and thus the chains 10 and 11 apart on the rods 13 and 14. In addition, the apertures 17, with the flat surfaces 15 of the rods 13 and 14, prevent rotation of the rods. Further, the flats 18 of the apertures 17 provide a large contact area on the flats 15 to reduce wear and possible elongation of the apertures 17. If the apertures 23 in the outer links 22 are made D shaped rather than round to accommodate the rod ends 12, they will also assist in locking the rods 13 and 14 against rotation and they will also better resist wear.

The rods 13 and 14 are preferably made of tempered steel to resist bending. The bearing blocks 20 are best made from sintered and oil impregnated steel to reduce friction as they slide over a supporting table (not shown). Blocks 20 also provide built-in internal lubrication for the chains 10 and 11 for cleaner operation of the conveyor. The teeth of drive or guide sprockets (not shown) would extend between the blocks 20 of the chains 10 and 11 and would thus be lubricated by them.

While I have shown and described my invention in the best form known to me, it will nevertheless be understood that this is purely exemplary and that modifications may be made without departing from the spirit and scope of the invention except as it may be more limited in the appended claims wherein I claim:

1. A conveyor having a pair of conveyor chains and rods extending therebetween, said rods being arranged in pairs, each of said pairs supported in spaced relation at each end by a link of one of said chains and being nonrotatably supported at at least one of said ends, and bearing blocks having opposed horizontal flat surfaces having two substantial dimensions and at least one horizontal slot formed in said bearing block to receive rods of adjacent pairs to form the conveyor chain connecting said pairs, said bearing blocks being constructed and arranged to support said conveyor on said horizontal flat surfaces, said longitudinal slot permitting said rods therein to slide toward each other to telescope said chain whereby said conveyor may pass about a curve.

2. A conveyor having a pair of conveyor chains and rods extending therebetween, said rods being arranged in pairs, each of said pairs supported in spaced relation at each end by a link of one of said chains and being nonrotatably supported at at least one of said ends, means limiting the inward movement of said link along said rods, and bearing blocks having opposed horizontal flat surfaces having two substantial dimensions and at least one horizontal slot formed in said bearing block to receive rods of adjacent pairs to form the conveyor chain connecting said pairs, said bearing blocks being constructed and arranged to support said conveyor on said horizontal flat surfaces, said longitudinal slot permitting said rods therein to slide toward each other to telescope said chain whereby said conveyor may pass about a curve.

3. A conveyor having a pair of conveyor chains and rods extending therebetween, said conveyor comprising, in combination, rods having ends with a longitudinal flat surface formed in each end, inner links of each chain with each inner link containing two spaced apertures with each spaced aperture having an outwardly disposed flat, said inner links being disposed about the ends of pairs of adjacent rods with the flats of said apertures being disposed against the longitudinal flat surfaces of the ends of said rods locking said rods against rotation, preventing inward movement of said inner links and thereby spacing said chains, and securing said rods in adjacent pairs, bearing blocks of each chain each containing a pair of elongated apertures of substantially the same width as the diameter of said rods, said ends of adjacent pairs of said rods extending through the elongated apertures of each bearing block, outer links of each chain each containing pair of spaced apertures through which the ends of the pairs of rods extend, said outer links being disposed alongside said inner links, and means securing said rods within said outer links.

4. The combination according to claim 3 wherein the pair of elongated apertures of each bearing block have rounded outer ends.

5. The combination according to claim 4 wherein the pair of apertures in each outer link have outwardly disposed flats disposed against the longitudinal flat surfaces of the ends of the pair of rods extending therethrough.

6. The combination according to claim 4, wherein said ends of said rods contain circumferential grooves, and wherein said means securing said rods within said outer links comprises oval link fasteners disposed about the ends of each pair of said rods outside said outer links, a portion of said link fasteners between each pair of rods being crushed together seating said link fasteners in the circumferential grooves of said rods.

7. The combination according to claim 4 wherein said bearing blocks are of sintered metal impregnated with a lubricant.

8. The combination according to claim 4 wherein said inner links have downward extending lower portions serving as chain guide means.

References Cited

UNITED STATES PATENTS

| 545,178 | 8/1895 | Sheldrick | 74—248 |
| 1,945,357 | 1/1934 | Pierce. | |
| 2,103,680 | 12/1937 | Kloucke | 198—189 |
| 3,225,901 | 12/1965 | Heinisch | 198—189 X |

FOREIGN PATENTS

| 1,344,486 | 10/1963 | France. |
| 919,827 | 2/1963 | Great Britain. |

EVON C. BLUNK, *Primary Examiner.*

R. J. HICKEY, *Assistant Examiner.*